United States Patent [19]

Okuma et al.

[11] Patent Number: 5,296,265

[45] Date of Patent: Mar. 22, 1994

[54] FLUIDIZED COATING APPARATUS HAVING PERFORATED ROTATING DISK AND METHOD OF USING SAME

[75] Inventors: Moriyuki Okuma; Takayasu Ishikawa; Shinichi Yamamoto, all of Fujieda; Akira Iwasaki; Masanori Ogawa, both of Tokyo, all of Japan

[73] Assignees: Kaken Pharmaceutical Co., Ltd., Tokyo; Okawara Mf. Co., Ltd., Shizuoka; Freund Industrial Co. Ltd., Tokyo, all of Japan

[21] Appl. No.: 982,087

[22] Filed: Nov. 25, 1992

[30] Foreign Application Priority Data

Nov. 26, 1991 [JP] Japan .................................. 3-310321

[51] Int. Cl.⁵ .............................................. B05D 7/00
[52] U.S. Cl. ..................................... 427/213; 118/303; 118/DIG. 5; 422/143
[58] Field of Search ................ 427/213, 185; 118/303, 118/DIG. 5; 422/143, 145

[56] References Cited

U.S. PATENT DOCUMENTS

| 4,034,126 | 7/1977 | Funakoshi et al. ................. 427/213 |
| 4,542,043 | 9/1985 | Abe et al. ............................ 118/303 |
| 4,556,175 | 12/1985 | Motoyama et al. .................... 241/57 |
| 4,724,794 | 2/1988 | Itoh ................................. 118/DIG. 5 |
| 4,834,299 | 5/1989 | Kishibata et al. .................. 427/213 |

FOREIGN PATENT DOCUMENTS

| 3839723 | 7/1989 | Fed. Rep. of Germany ...... 118/303 |
| 54-11263 | 5/1979 | Japan . |
| 59-95924 | 6/1984 | Japan . |
| 60-7930 | 1/1985 | Japan . |
| 60-25182 | 6/1985 | Japan . |
| 61-8734 | 3/1986 | Japan . |
| 61-8735 | 3/1986 | Japan . |
| 61-8736 | 3/1986 | Japan . |
| 61-165577 | 7/1986 | Japan . |
| 62-258734 | 11/1987 | Japan . |
| 63-2212 | 1/1988 | Japan . |
| 63-2213 | 1/1988 | Japan . |
| 63-33900 | 7/1988 | Japan . |

Primary Examiner—Terry J. Owens
Attorney, Agent, or Firm—Kane, Dalsimer, Sullivan, Kurucz, Levy, Eisele and Richard

[57] ABSTRACT

A fluidized coating apparatus wherein a rotatable perforated disk 2 is provided at the lower portion of a processing cylinder 1 and perforated disk opening portions 3 are provided in the vicinity of the outer peripheral edge of this perforated disk 2. The ratio of the total opening area of the perforated disk opening portions 3 to an area of an annular slit 8 formed between the perforated disk 2 and the inner wall of the processing cylinder 1 is within the range from 0.2 to 0.6. Each of the perforated disk opening portions 3 is provided with a cover and side walls so that gas is blown out outwardly in the radial direction or obliquely backward with respect to a rotating direction within 30° to the radial direction of the perforated disk.

4 Claims, 6 Drawing Sheets

FLUIDIZED COATING APPARATUS HAVING PERFORATED ROTATING DISK AND METHOD OF USING SAME

BACKGROUND OF THE INVENTION

1. Field of the Invention

This invention relates to a technique of fluidized coating, having a rotatable perforated disk.

2. Related Art Statement

A fluidized granulating and coating apparatus has heretofore been widely used in many fields for granulating and coating foodstuff, pharmaceutical preparations, feedstuff, detergents, cosmetics, toners, catalysts and the like. However, such disadvantages have been presented that, when used as a granulating apparatus, granulaited particles have low bulk densities, forms of the particles are undetermined, a distribution of particle sizes is wide and so forth, and, when used as a coating apparatus, the coating efficiency is low, material to be coated tends to be collapsed, coated film is not dense and so forth.

Therefore, in order to obviate these disadvantages, and further, to improve the production efficiency, various improved apparatuses have been proposed, and some of them have been pratically used.

For example, Japanese Patent Publication No. 54-11263 and Japanese Patent Application Laid-Open No. 60-7930 propose that fluidizing air is blown out in the tangent direction to a fludizing chamber so that the blown-out fluidizing air becomes a spiral flow, while a perforated disk at the bottom of the fluidizing chamber is kept fixed. The apparatus of 54-11263 has even an agitator. However, these are apparatuses for granulating and drying, so that the pertinency as a coating apparatus is not clear.

There have been proposed many apparatuses wherein a perforated disk is made rotatable. Japanese Patent Application Laid-Open No. 62-258734 shows an apparatus provided with a rotatable disk having a ventilation net, and Japanese Patent Publication No. 63-33900 shows a combination of a rotatable perforated disk, which is provided with small holes as usual, and an agitating bar.

Both are apparatuses for mixing, granulating, drying, disintegrating and so forth.

Furthermore, Japanese Patent Application Laid-Open No. 61-165577 shows an apparatus wherein a perforated disk, through which fluidizing air is blown out in the tangent direction, is rotated. This apparatus is also a granulating and drying machine.

As a coating apparatus provided with a rotatable perforated disk, there can be listed ones disclosed in Japanese Patent Publications Nos. 63-2212, 63-2213, 60-25182, 61-8734, 61-8735 and 61-8736, and Japanese Patent Application Laid-Open No. 59-95924 and so forth.

Out of these, the apparatus disclosed in Japanese Patent Publication No. 63-2213 is one including a special rotatable disk, which has an inclined surface, and a disintegrating rotor, and Japanese Patent Publication Nos. 63-2212 and 63-25182 disclose a rotatable disk comprising multi-layer rings as a mechanism for blowing out air outwardly through slits between the rings. Japanese Publication No. 61-8734 relates to an apparatus wherein agitating blades are provided above a rotatable disk. Japanese Patent Publication No. 61-8735 relates to an apparatus having a disintegrating device. Japanese Patent Publication No. 61-8736 relates to an apparatus wherein air passing through perforations of a rotatable disk and air passing through a slit formed between the disk and the wall of the apparatus are controlled independently of each other. And, Japanese Patent Application Laid-Open No. 59-95924 relates to an adjusting mechanism for air passing through the above-described slit. Apparatuses in which some or all techniques of the above-described four inventions are suitably combined together have been sold in the market and widely used.

Out of the conventional apparatuses described above, the apparatuses disclosed in Japanese Patent Publications Nos. 63-2213 and 61-8735 include the special rotatable disks which require high costs for manufacture and the disintegrating device must be operated, so that these apparatuses are not so suitable for coating.

Furthermore, in the apparatuses disclosed in Japanese Patent Publications Nos. 63-2212 and 60-25182, it is intended that air flows through the substantially whole surface of the rotatable disk except for the central portion, whereby, in fact, almost all air is blown out from the inner area where particles are thinly distributed due to the centrifugal force of the rotation (a blow-through phenomenon), so that fludizing flow cannot be favorably achieved, and it is difficult to wash the rotatable disk due to the complicated construction thereof. Furthermore, only a coating solution of lower concentration can be used due to the uneven ventilation described above, so that the efficiency of coating is unsatisfactory.

Further, in the apparatuses disclosed in Japanese Patent Publications Nos. 61-8734 and 61-8736, Japanese Patent Application Laid-Open No. 59-95924 and so forth, perforations are disposed at a relatively outer side of a rotatable disk, and, in the apparatuses disclosed by the latter two inventions, air passing through the slit, which is formed between the perforated disk and the wall of the apparatus, and air through the perforated disk can be controlled independently of each other, whereby the above-described disadvantages can be obviated. However, the mechanisms are complicated for obviating the above disadvantages, and the prices of the apparatuses are high.

SUMMARY OF THE INVENTION

An object of the present invention is to provide a technique of fluidized coating, capable of attaining effects equal to or more superior than the cases using the conventional apparatuses provided with the complicated perforated disk and additional mechanisms, only by using a simple rotatable perforated disk without requiring any complicate additional mechanisms.

Another object of the present invention is to provide a technique of fluidized coating, capable of producing a coated product having high quality.

In a fluidized coating apparatus according to the present invention, opening portions of a perforated disk, which are formed by punching and the like, are positioned in the vicinity of the outer peripheral edge of the disk and the total opening area of the opening portions of the perforated disk is within the range from 0.2 to 0.6 times of an area of an annular slit formed between the perforated disk and the inner wall of a processing cylinder. With this arrangement, it is avoided that fluidizing air is blown through at a portion where particles are thinly distributed, so that particles can be fluidized satisfactorily.

Openings of the perforated disk can be provided in any forms. For example, openings may be provided in a form of simple holes or a net.

It is preferable that each of the openings of the perforated disk is provided at the top thereof with a cover, and air is blown out outwardly in the radial direction of the perforated disk or obliquely backward in the rotating direction within an angle of 30° to the radial direction of the perforated disk. Such openings can be easily obtained by punching the disk to such a degree that the cover portions are formed but are not cut off by a press.

Here, "the total opening area of the perforated disk" means the total area of the openings formed by the above-described punching, through which air is blown out. When the above-described ratio is less than 0.2, small amount of air passes through the portions where the particles are accumulated, whereby drying capacity becomes insufficient. On the contrary, when the ratio exceeds 0.6, a blow-through phenomenon easily occurs, whereby tumbling of articles to be processed becomes insufficient, so that the denseness of a coated film is inferior.

Furthermore, when air is blown out outwardly and obliquely backward at an angle exceeding 30° to the radial direction, air flow becomes turbulent due to the collision between the spray air and the blown-out air, influencing adversely on a spray pattern or fluidizing conditions. By directing the openings in the oblique direction within 30°, such an advantage can be obtained that the damages and leakage of the particles can be avoided.

Furthermore, in the apparatus according to the present invention, it is preferable that a spray device for a coating solution is provided right above the rotatable perforated disk. In the conventional case where coating solution is sprayed from the top of a fluidizing chamber, even if the rotatable perforated disk is used, when the concentration of the solid contents in the coating solution is raised, the coating solution is dried before it reaches the surfaces of the particles (a so-called "dusting phenomenon"), so that the efficiency of coating is deteriorated. On the other hand, in the conventional technique which employs static perforated disk and a spray device provided right above it, tumbling action does not occur, so that such disadvantages are presented that the coated film is inferior in its denseness, and agglomeration of particles occurs when the concentration of the solid content in the coating solution is raised.

In order to perform coating of particles such as granules by use of the apparatus according to the present invention, the particles are loaded in the apparatus, gas such as air is delivered from below the perforated disk to fluidize the particles while the perforated disk is rotated, and the coating solution is sprayed suitably, thus requiring no complicate control.

In the coating operation by the method of the present invention, the particles to be coated are subjected to both fluidizing and tumbling actions, and the concentration of the coating solution can be greatly raised as compared with the conventional methods, particularly when the spray device is provided right above the perforated disk. Thereby, rationalizing effects such as shortening of the coating time, decrease in heat quantity required for drying and the like can be achieved. And, the coat film of the coated particles becomes more dense and an expected effect can be attained by use of smaller amount of coating solution, and therefore, the above-described rationalizing effects become so much larger.

Coating feasibility greatly depends upon a viscosity of a coating solution. According to the conventional common knowledge, the viscosity of the coating solution should be set at a value less than 100 cps. However, according to the present invention, in the Experimental Example 1 described below, viscosity was 290 cps for the coating solution of 16% concentration, and 980 cps for the 20% concentration solution. Although there is not shown in Table 1, it was possible to use up to 22% solution (1590 cps). Accordingly, it is concluded that, if the viscosity of the coating solution is 1500 cps or therebelow, then the method of the present invention can be applied successfully.

Other objects and characteristics of the present invention will become apparent from the following detailed description and the accompanying drawings.

DETAILED DESCRIPTION OF THE PREFERRED EMBODIMENT

Figure 1:
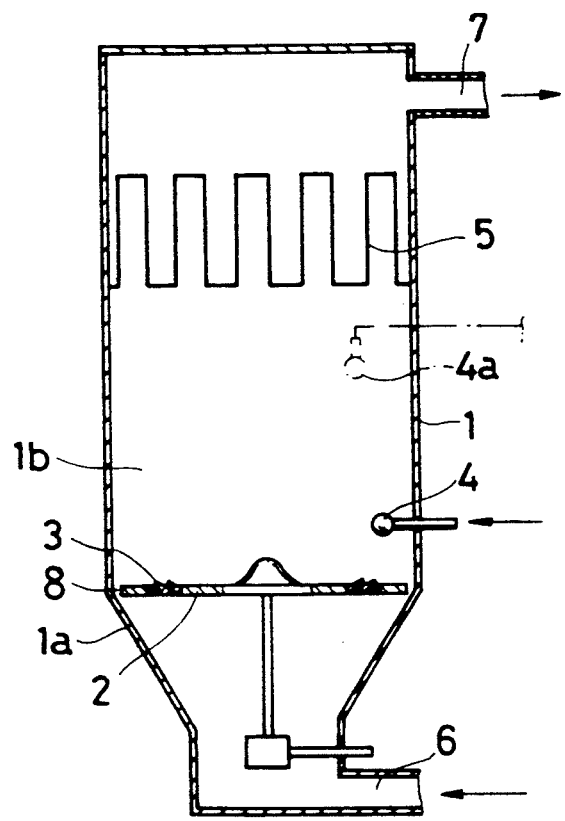
FIG. 1 is a general schematic sectional view showing one embodiment of the fluidized coating apparatus according to the present invention.

As shown in FIG. 1, a fluidized coating apparatus according to the present invention generally comprises:

a processing cylinder 1 of a substantially cylindrical shape provided with a tapered portion 1a at the lower portion thereof;

a perforated disk 2 rotatably provided at the bottom of a fluidizing chamber 1b of the processing cylinder 1 and partly provided with perforated disk opening portions 3;

a spray nozzle (spray device) 4 for spraying coating solution, which is provided right above the perforated disk 2 in the vicinity thereof; and a bag filter 5 for catching fine particles such as coating dust.

Furthermore, a gas supply port 6 for supplying gas from below the perforated disk 2 is provided at the bottom of the processing cylinder 1, while a gas discharge port 7 is provided close to the top of the processing cylinder 1.

A driving source such as a motor for rotating the perforated disk 2 is not shown.

In this embodiment, the perforated disk opening portions 3 of the perforated disk 2 are positioned close to the outer peripheral edge of the perforated disk 2, and an annular slit 8 is formed between the outer peripheral edge of the perforated disk 2 and the inner wall of the processing cylinder 1.

The perforated disk opening portions 3 are perforated by punching suitable portions of the disk 2 by use of a press, for example.

Figure 4:
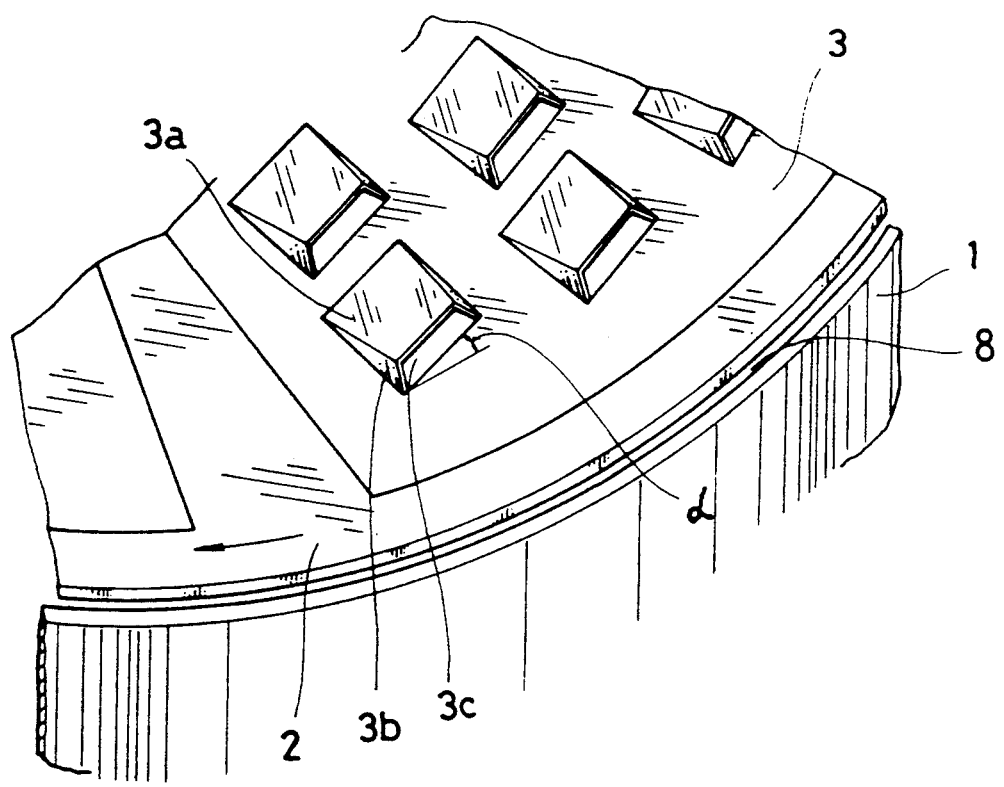
FIG. 4 is an enlarged partial perspective view showing a perforated disk opening portion.
Figure 5A:
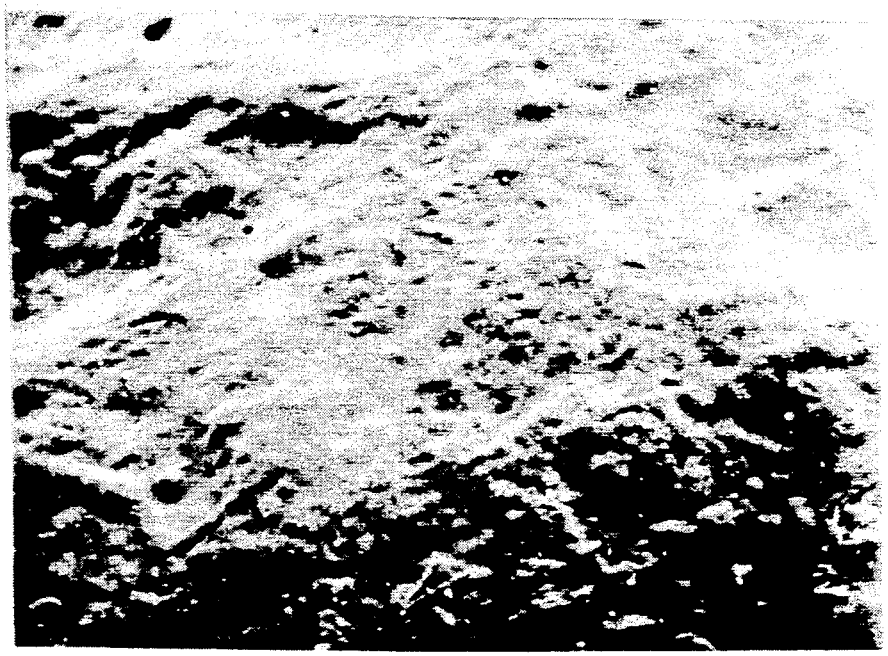
FIGS. 5a and 5b are photographs by a scanning electron microscope, showing respectively surface and cross-section of a granule produced in Experimental Example 1 of the present invention.
Figure 5B:
Figure 6A:
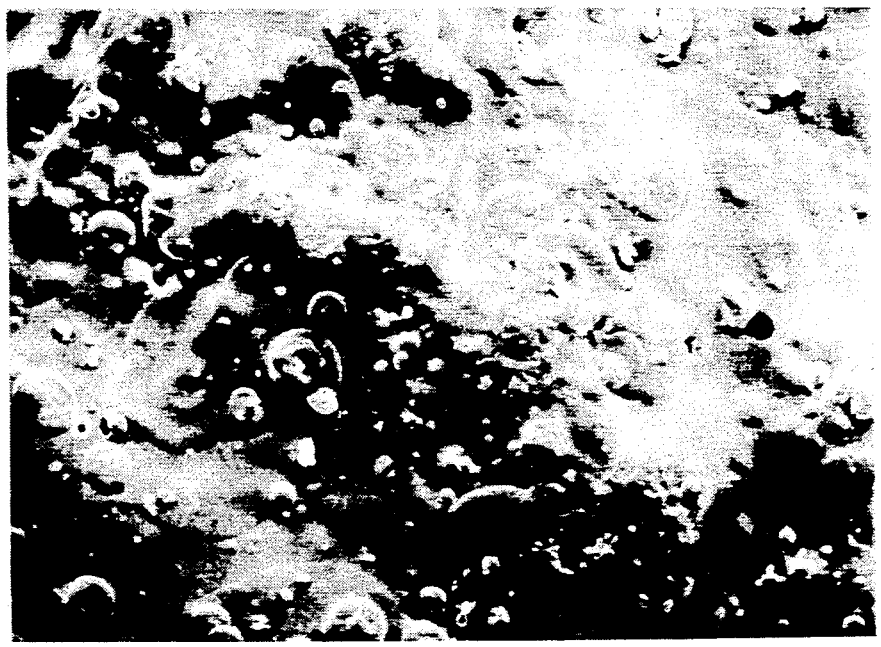
FIGS. 6a and 6b are photographs by a scanning electron microscope, showing respectively surface and cross-section of a granule produced in Comparative Example 3.
Figure 6B:
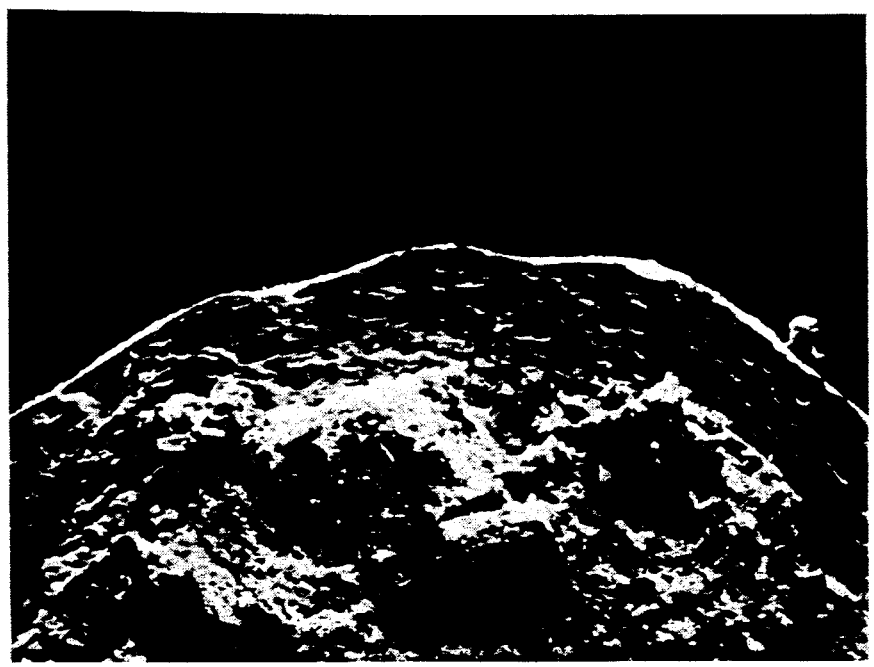

That is, as shown in FIG. 4, the perforated disk opening portions 3 in this embodiment is partially perforated by the press in such a manner that each hole is provided at the top thereof with a cover portion 3a, at the sides thereof with side wall portions 3b, and toward the outer periphery of the perforated disk 2 with a substantially trapezoidal opening 3c.

Figure 3A:
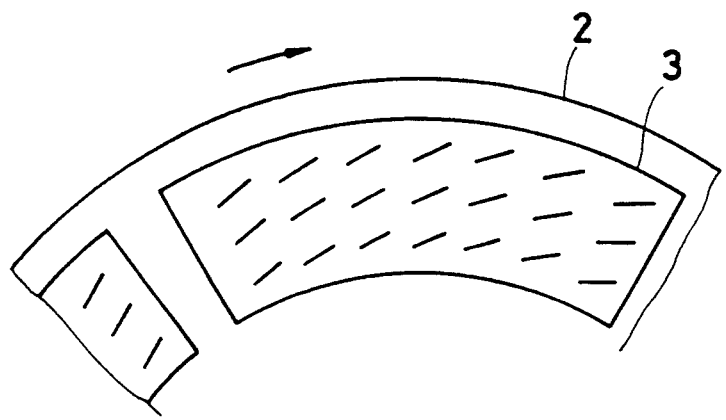
FIGS. 3a and 3b are partial plan views showing the essential portions of the perforated disk.
Figure 3B:
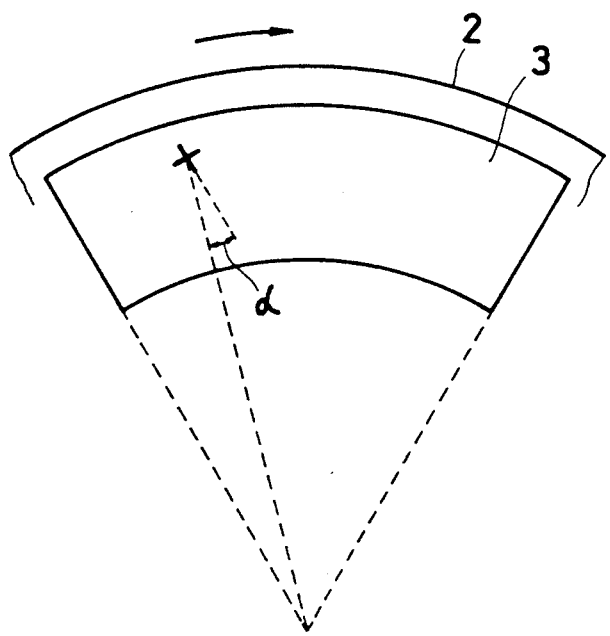

The openings 3c face outward in the radial direction of the perforated disk 2 or at an angle $\alpha$ not greater than 30° to the radial direction so that the gas is blown out in the radial direction or obliquely to the radial direction and backward in the rotating direction of the disk 2 (Refer to FIG. 3b).

Furthermore, the total opening area of all the openings 3c is made to be within the range from 0.2 to 0.6 in ratio based on the area of the annular slit formed between the perforated disk 2 and the inner wall of the processing cyliner 1.

In this embodiment, when a coating operation of fluidized coating is applied to the particles, first, the particles are loaded into the processing cylinder 1, and the gas is supplied from below the perforated disk 2 through the gas supply port 6 while the perforated disk 2 is rotated by a driving force from the driving source not shown.

By this, the gas is caused to flow into the fluidizing chamber 1b in the processing cylinder 1 through the openings 3c of the perforated disk opening portions 3 and through the annular slit 8, to thereby fluidize the particles.

Then, the coating solution is sprayed into the fluidizing chamber 1b from the spray nozzle 4 to coat the particles.

EXPERIMENTAL EXAMPLE 1

Figure 2:
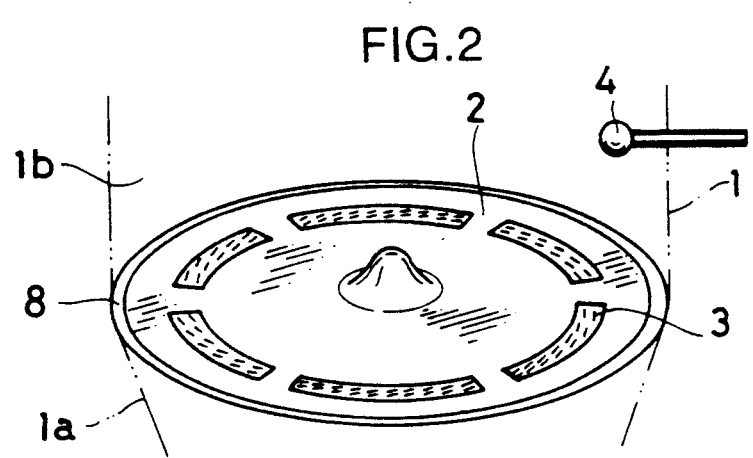
FIG. 2 is a schematic perspective view showing a perforated disk portion thereof.

A fludized coating apparatus according to the present invention was prepared by providing such a perforated disk as shown in FIGS. 2 and 3a to a fluidized granulating and coating apparatus, model FLO-5 a (Diameter of a Processing Cylinder is 400 mmΦ manufactured by Freund Industrial Co., Ltd.) As for shapes of perforations, the openings were of trapezoidal shapes and opened outwardly in the radial direction of the perforated disk and obliquely backward in the rotating direction as shown in FIG. 4. The angle thereof (angle $\alpha$ in FIG. 3b) was 10° and the total opening area was 12.5 cm$^2$. The slit formed between the perforated disk and the inner wall of the processing cylinder was 0.2 mm in its width, the area of this slit was 25.0 cm$^2$, and a ratio of the total opening area of the opening portions of the perforated disk to the area of the annular slit was 0.50. The spray nozzle for spraying the coating solution was provided right above the perforated disk as shown in FIGS. 1 and 2.

For comparison, experiments were performed for cases of providing the spray nozzle of the coating solution upwardly as conventional (Refer to two-dot chain lines 4a in FIG. 1) and for cases of providing the spray nozzle right above the perforated disk, both in the fluidized coating apparatus according to the present invention and in the normal fluidized granulating and coating apparatus FLO-5.

Enteric-coated granules were testingly produced by using pancreatin granules as nuclei to be coated. Coating solutions were prepared by dissoving a hydroxypropylmethylcellulose phthalate, HP-55 (manufactured by Shin-etsu Chemical Industry Co., Ltd.) at predetermined concentrations into a solvent mixture of dichloromethane and ethanol (7:3 (w/w)). Myvacet (acetylated monoglyceride, manufactured by Eastman Kodak Co., Inc.) was used as a plasticizer in an amount of ⅓ by weight of HP-55. The loaded amount of particles to be coated was 5 kg and the supplied air temperature 48° C. The results are shown in Table 1.

TABLE 1

| | | | Results of coating | | | |
|---|---|---|---|---|---|---|
| | perforated | nozzle | concentration of HP-55 (%) | | | |
| class | disk | position | 8 | 12 | 16 | 20 |
| Experimental Example 1 | rotating | lower | 99 (0.3) | 99 (0.4) | 99 (0.5) | 99 (0.5) |
| Comparative Example 1 | rotating | upper* | 90 (1) | 76 (4) | 51** (—) | X |
| Comparative Example 2 | static | lower | 98 (2) | 95 (13) | X*** | X*** |
| Comparative Example 3 | static | upper | 97 (1) | 87 (3) | 61** (—) | X |

The numerical values in Table indicate the coating yields i.e, the ratio of the amount of the coating material adhered to the particles to the amount of the coating material sprayed taking no account of solvent and those in the parentheses indicate rates of generating agglomerates (both in %).
Note:
X: Impossible to coat
*The coating solution did not satisfactorily reach the particles when the nozzle was positioned at the center, and therefore, the nozzle was positioned close to the wall of the apparatus.
**Severe dusting occurred and First Liquid resistance of the coated granules obtained was unsatisfactory.
***Agglomerates were generated at an earlier stage. and it was impossible to coat.

As for the coated granules produced by using 8% HP-55 in Experimatal Example 1 and Comparative Example 1, resistances against First Liquid (artificial gastric juice) defined in the Japanese pharmacopoeia (as 2.0 g of sodium chloride dissolved in 24.0 ml of dilute hydrochloric acid and sufficient water to make 1000 ml dissolved, with the solution being colorless, clear and its pH is about 1.2) were tested by varying an amount of coating, and results obtained are shown in Table 2. In Table 2, amounts of coating are percents by weight based on the loaded amount of the particles to be coated.

TABLE 2

| | perforated | nozzle | amount of coating | | |
|---|---|---|---|---|---|
| class | disk | position | 13% | 17% | 21% |
| Experimental Example 1 | rotating | lower | 84% | 95% | 99% |
| Comparative Example 3 | static | upper | 74% | 86% | 97% |

First Liquid resistance: as a test liquid, First Liquid according to the Japanese pharmacopoeia was used and residual potency (%) of pancreatin after shaking for one hour by a disintegration tester were shown.

From the result shown in Table 2, it is known that, the coated granules of the Experimental Example 1 have satisfactory First Liquid resistances with less amount of coating in comparison with the coated granules of Comparative Example 3.

Furthermore, pairs of FIGS. 5a and 5b, and FIGS. 6a and 6b show scanning electron microscopic photographs of surfaces and cross-sections of Experimental Example 1 and Comparative Example 3, respectively. From these photographs, it is seen that the granule obtained in Experimental Example 1 have a coating layer denser and smoother than one obtained in Comparative Example 3. It is considered that, owing to this dense coating layer, satisfactory First Liquid resistance is obtained with less coating amounts.

EXPERIMENTAL EXAMPLE 2

Same apparatuses as in Experimental Example 1 and Comparative Example 3 were used except that the angle α of the opening was set at 5° and the total opening area of the disk was set at 14.0 cm² (ratio of 0.56 based on the slit area). As particles to be coated, granules containing 20% of dl-isoprenaline hydrochloride were used, and a coating solution was prepared by dissolving ethylcellulose into a solvent mixture of dichloromethane and ethanol (4:6 (w/w)) at a predetermined concentration, to thereby testingly produce prolonged release granules. Test results of the coating and coated granules are shown in Table 3.

TABLE 3

| | | | Results of coating and coated granules | | | | |
|---|---|---|---|---|---|---|---|
| | | | concentration | amount | | released amount | |
| class | perforated disk | nozzle position | of ethyl- cellulose | of coating | time required | after 1 hour | after 2 hours |
| Experimental Example 1 | rotating | lower | 8% | 5% | 30 min | 34% | 64% |
| Comparative Example 4 | static | upper | 4% | 5% | 60 min | 41% | 72% |

Released amount: as a test liquid, First Liquid of the Japanesse pharmacopoeia was used and released amounts of dl-isoprenaline hydrochloride after shaking for one hour and two hours by a disintegration tester were shown.

There was also performed a test which was same as Comparative Example 4 except that concentration of ethylcellulose was 8%, and the produced coating layers were not uniform with particles, and variation in the release rate was large, so that an accurately controlled prolonged release was not obtained.

As apparent from Table 3, in Experimental Example 2, concentration of ethylcellulose can be raised and the time required for coating can be shortened to ½ in comparison with Comparative Example 4.

Further, in Experimental Example 2, larger prolonged release effect was attained than Comparative Example 4 with the same coating amount.

Figure 7:
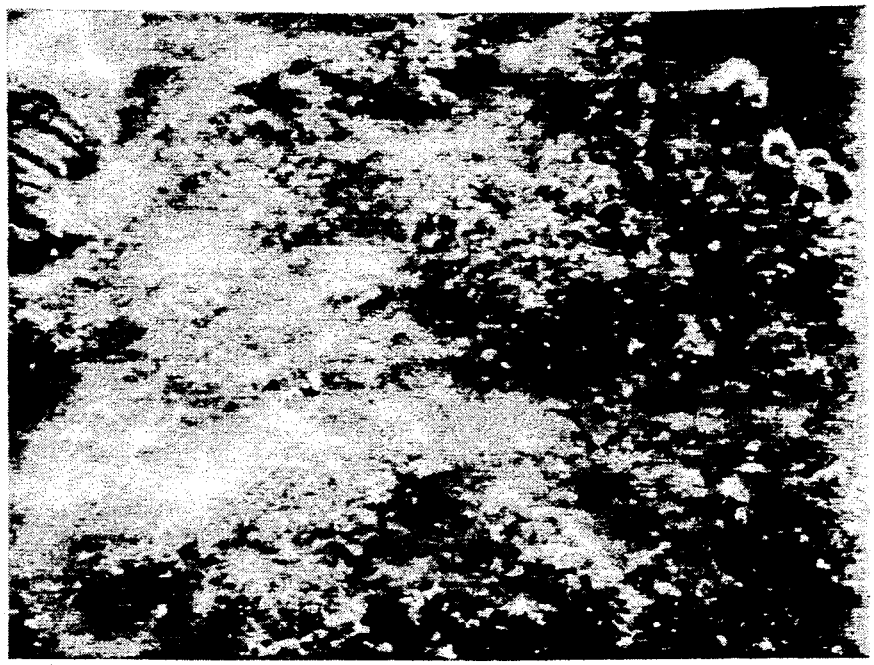
FIG. 7 is a photograph by a scanning electron microscope, showing surface of a granule produced in Experimental Example 2 of the present invention.
Figure 8:
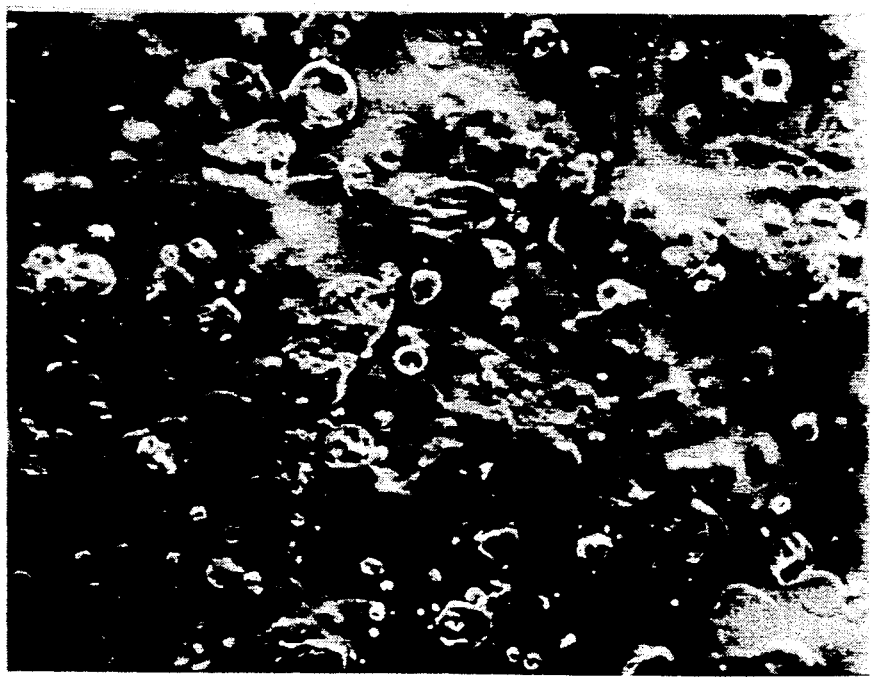
FIG. 8 is a photograph by a scanning electron microscope, showing surface of a granule produced in Comparative Example 4.

FIGS. 7 and 8 show scanning electron microscopic photographs of the surfaces of the granules obtained by Experimental Example 2 of the present invention and Comparative Example 4, respectively.

EXPERIMENTAL EXAMPLE 3

A fluidized granulating and coating apparatus FLO-120 (diameter of a processing cylinder is 1200 mmφ, manufactured by Freund Industrial Co., Ltd.) was provided with a perforated disk similar to the one shown in Experimental Example 1, except that the angle α of the openings was set at 20° and the total opening area of the disk was set at 45.0 cm². The slit between the perforated disk and the inner wall of the apparatus was 0.4 cm in its width, and the area of this slit was 150.7 cm², giving 0.299 as the ratio of the total opening area of the disk to the slit area.

By using this apparatus, the same particles as in Experimental Example 1 were coated with the same coating solution on condition that the loaded amount was 100 kg, the supplied air temperature was 50° C. and the concentration of HP-55 was 20%. The coating was smoothly performed, the coating yield was 99% and the rate of generating agglomeration was 0.3%. The time required before the coating amount reached 20% was 160 min. In contrast therewith, according to the conventional method wherein the spraying was performed from above by use of FLO-120 model, dusting occurred when the concentration of HP-55 exceeded 12%, and it was unable to perform coating. When the concentration of HP-55 was set at 8% in the conventional method, the time required before the coating amount reached 20% was 208 min.

When First Liquid resistance of the coated granules obtained by Experimental Example 3 was tested similarly to Experimental Example 1, there was shown the residual potency of 99%.

The effects of the typical invention disclosed herein are briefly described as follows.

(1) Making the ratio of the total opening area of the perforated disk opening portions to the area of the slit, which is formed between the perforated disk and the inner wall of the processing cylinder, within the range from 0.2 to 0.6, particles can be fluidized satisfactorily, and thus, it is possible to obtain coated products of satisfactory quality.

(2) Further, the perforated disk opening portion has the openings for blowing out gas outwardly to the radial direction of the perforated disk or obliquely backward in the rotating direction within 30° to the raial direction of the perforated disk, so that adverse influence is not given on the fluidized conditions and break and leakage of the particles are avoided.

(3) The device for spraying coating solution is positioned above and close to the perforated disk, whereby the concentration of the coating liquid can be greatly raised, so that time required for coating can be shortened, heat quantity required for drying can be cecreased and coat film can be made dense.

What is claimed is:

1. A fluidized coating apparatus comprising:
a processing cylinder, and
a rotatable perforated disk provided at a lower axial portion of the processing cylinder, having perforated disk opening portions only in the vicinity of the perforated disk outer peripheral edge so that the ratio of total opening area of the perforated disk opening portions to the area of an annular slit formed between the perforated disk and an inner wall of the processing cylinder is within the range from 0.2 to 0.6.

2. The fluidized coating apparatus as set forth in claim 1, wherein:
the perforated disk opening portions are perforated in such a way that each of the openings is provided at the top thereof with a cover portion and at the sides thereof with side wall portions, so that gas is blown out outwardly in the radial direction of the perforated disk or obliquely backward with respect to a rotating direction within 30° to the radial direction of the perforated disk.

3. The fluidized coating apparatus as set forth in claim 1, wherein:
   a device for spraying a coating solution is positioned above and in the vicinity of the perforated disk.

4. A method of coating comprising:
   loading particles onto the rotatable perforated disk in the fluidized coating apparatus as set forth in claim 1,
   supplying a gas from below the perforated disk while the perforated disk is rotated to fluidize the particles, and
   spraying a coating solution from a spray device to coat the particles.

* * * * *